(12) United States Patent
Wen

(10) Patent No.: US 10,562,586 B2
(45) Date of Patent: Feb. 18, 2020

(54) MECHANICAL BRAKE CALIPER FOR A BICYCLE

(71) Applicant: Yuan-Hung Wen, Chang Hua County (TW)

(72) Inventor: Yuan-Hung Wen, Chang Hua County (TW)

( * ) Notice: Subject to any disclaimer, the term of this patent is extended or adjusted under 35 U.S.C. 154(b) by 44 days.

(21) Appl. No.: 15/920,210

(22) Filed: Mar. 13, 2018

(65) Prior Publication Data

US 2018/0297662 A1 Oct. 18, 2018

(30) Foreign Application Priority Data

Apr. 14, 2017 (TW) .............................. 106112544 A

(51) Int. Cl.
| | | |
|---|---|---|
| *B62L 1/00* | (2006.01) | |
| *F16D 55/224* | (2006.01) | |
| *F16D 55/2255* | (2006.01) | |
| *F16D 65/00* | (2006.01) | |
| *F16D 65/18* | (2006.01) | |
| *F16D 121/14* | (2012.01) | |
| *F16D 55/00* | (2006.01) | |

(52) U.S. Cl.
CPC ............ *B62L 1/00* (2013.01); *F16D 55/2245* (2013.01); *F16D 55/2255* (2013.01); *F16D 65/0075* (2013.01); *F16D 65/18* (2013.01); *F16D 2055/002* (2013.01); *F16D 2121/14* (2013.01)

(58) Field of Classification Search
CPC ........ B62L 1/00; B62L 1/005; F16D 55/2245; F16D 55/2255; F16D 55/228; F16D 65/0068; F16D 65/0075; F16D 65/02; F16D 65/18; F16D 2055/002; F16D 2121/14; F16D 2125/36
See application file for complete search history.

(56) References Cited

U.S. PATENT DOCUMENTS 6,148,964 A * 11/2000 Huang ...................... B62L 1/00
188/218 XL
2018/0023644 A1* 1/2018 Lin ...................... F16D 55/2265
188/71.8

FOREIGN PATENT DOCUMENTS

EP 0542134 A1 * 5/1993 ................ B62L 1/00
TW I542798 B 7/2016

* cited by examiner

*Primary Examiner* — Melanie Torres Williams
(74) *Attorney, Agent, or Firm* — Muncy, Geissler, Olds & Lowe, PC

(57) ABSTRACT

A mechanical brake caliper for a bicycle is provided, including: a caliper body, having two mounting holes which are disposed on two opposite sides of the caliper body; two axially-movable mechanisms, movably assembled to the two mounting holes respectively; and a linkage mechanism, having two arm portions which are connected with the two axially-movable mechanisms respectively, and a mounting structure being for securing a brake cable, the linkage mechanism rotating the two axially-movable mechanisms to move axially to actuate two brake pads toward a disc respectively, the two arm portions rotating about a first rotation center portion and a second rotation center portion respectively, torques to the first rotation center portion and the second rotation center portion as a force acting on the mounting structure by the brake cable being substantially the same.

8 Claims, 4 Drawing Sheets

MECHANICAL BRAKE CALIPER FOR A BICYCLE

BACKGROUND OF THE INVENTION

Field of the Invention

The present invention relates to a mechanical brake caliper for a bicycle.

Description of the Prior Art

A bicycle becomes more popular recently. Dealers not only develop better transmission systems, but also dedicate to develop brake systems. The brake systems are concerned with a safety of riders. Common brakes are hanging brakes, C-brakes, V-brakes and so on. Wherein, calipers usually are used on higher performance bicycles, and the calipers include hydraulic calipers and mechanical calipers. Due to a high price of the hydraulic calipers, the mechanical calipers are more acceptable for beginners. For example, TWI542798 discloses a conventional mechanical caliper.

In the conventional mechanical caliper, the brake pads are actuated to move relative to the caliper body to clip a disc by components which are connected to each other, so as to achieve a braking function. The conventional mechanical caliper includes two axially-movable mechanisms and a lever, the lever has a secured hole for securing a brake cable and two axial portions respectively connected with one of the axially-movable mechanisms. However, torques to the two axial portions as a force act on the secured hole are different, and to lead the two axially-movable mechanisms clips the two sides of the disc in the different forces.

The present invention is, therefore, arisen to obviate or at least mitigate the above mentioned disadvantages.

SUMMARY OF THE INVENTION

An object of the present invention is to provide a mechanical brake caliper for a bicycle, in which the mechanical brake caliper for a bicycle provides substantially same forces to clip two sides of a disc.

To achieve the above and other objects, a mechanical brake caliper for a bicycle is provided, including: a caliper body, having two mounting holes which are disposed on two opposite sides of the caliper body; two axially-movable mechanisms, movably assembled to the two mounting holes respectively; and a linkage mechanism, having two arm portions which are connected with the two axially-movable mechanisms respectively, and a mounting structure being for securing a brake cable, the linkage mechanism rotating the two axially-movable mechanisms to move axially to actuate two brake pads toward a disc respectively, the two arm portions rotating about a first rotation center portion and a second rotation center portion respectively, torques to the first rotation center portion and the second rotation center portion as a force acting on the mounting structure by the brake cable being substantially the same.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
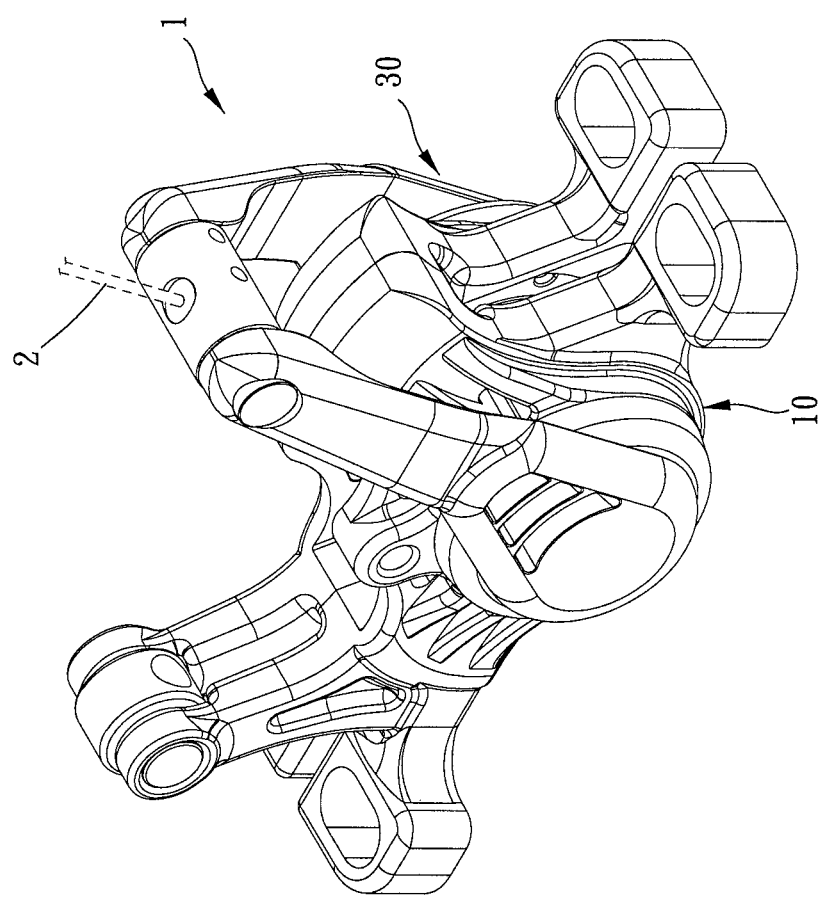
FIG. 1 is a perspective view of a mechanical brake caliper for a bicycle according to a preferred embodiment of the present invention.
Figure 2:
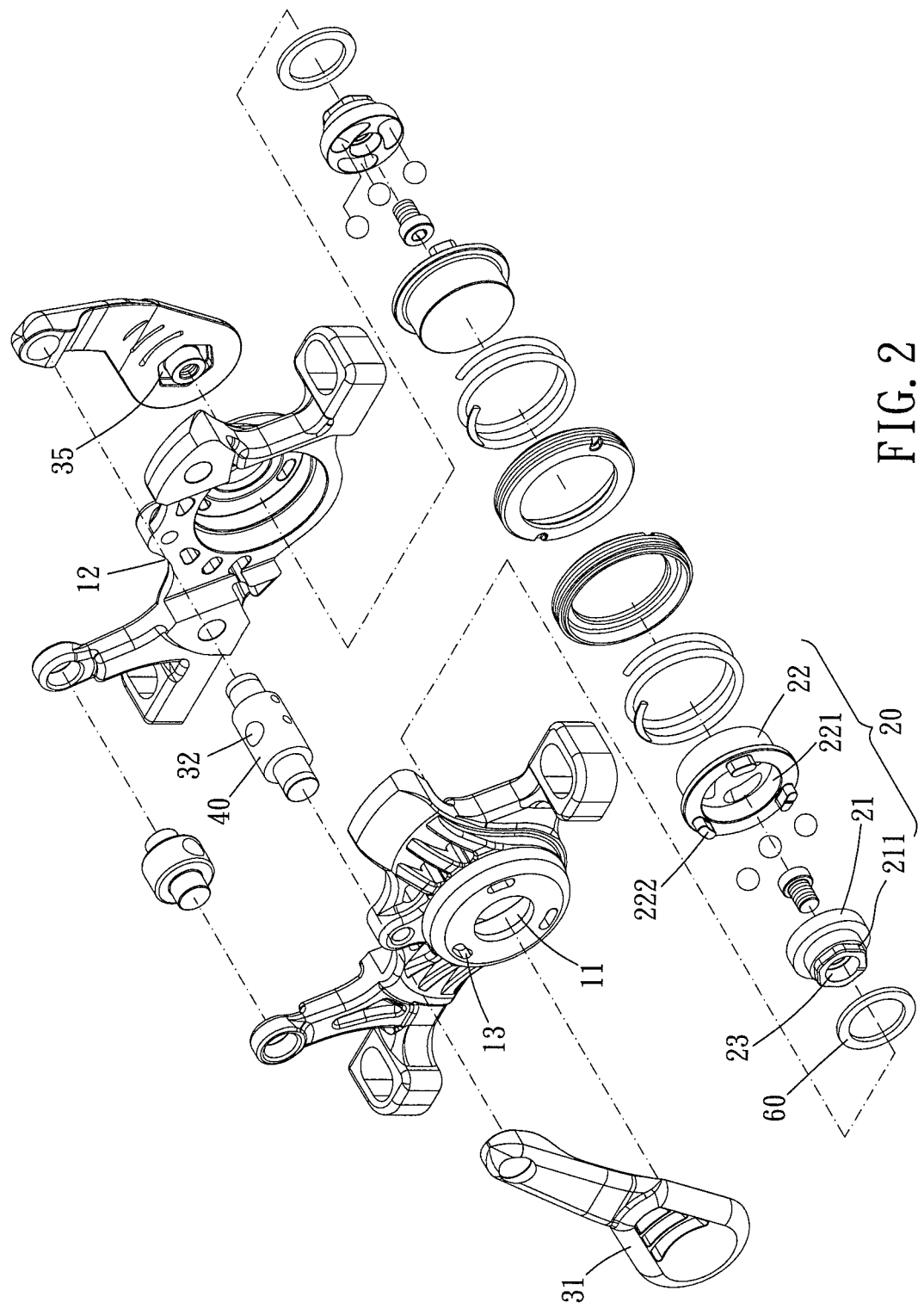
FIG. 2 is a breakdown drawing of the mechanical brake caliper for a bicycle according to a preferred embodiment of the present invention.
Figure 3:
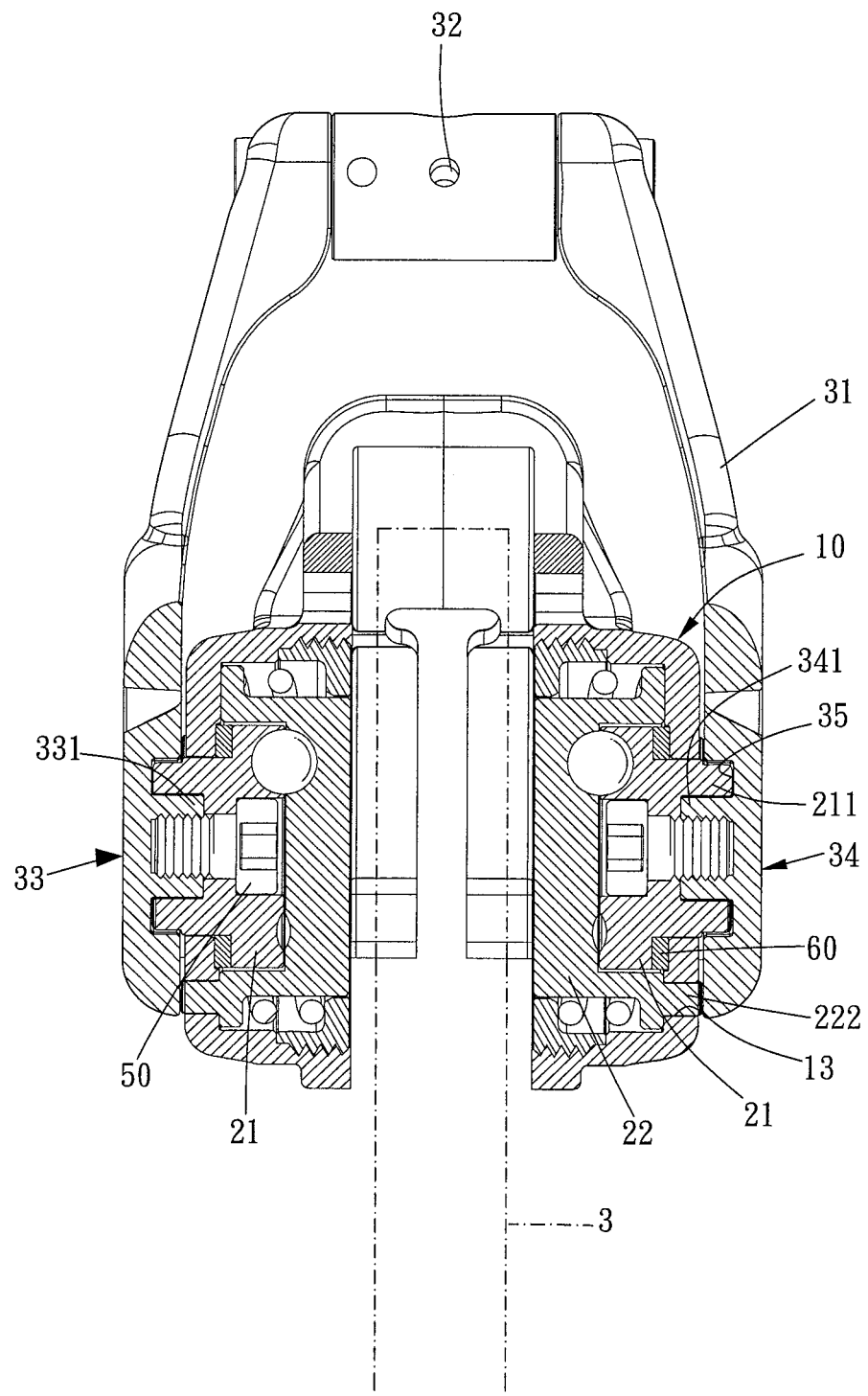
FIG. 3 is a cross-over section view of a preferable embodiment of the present invention.
Figure 4:
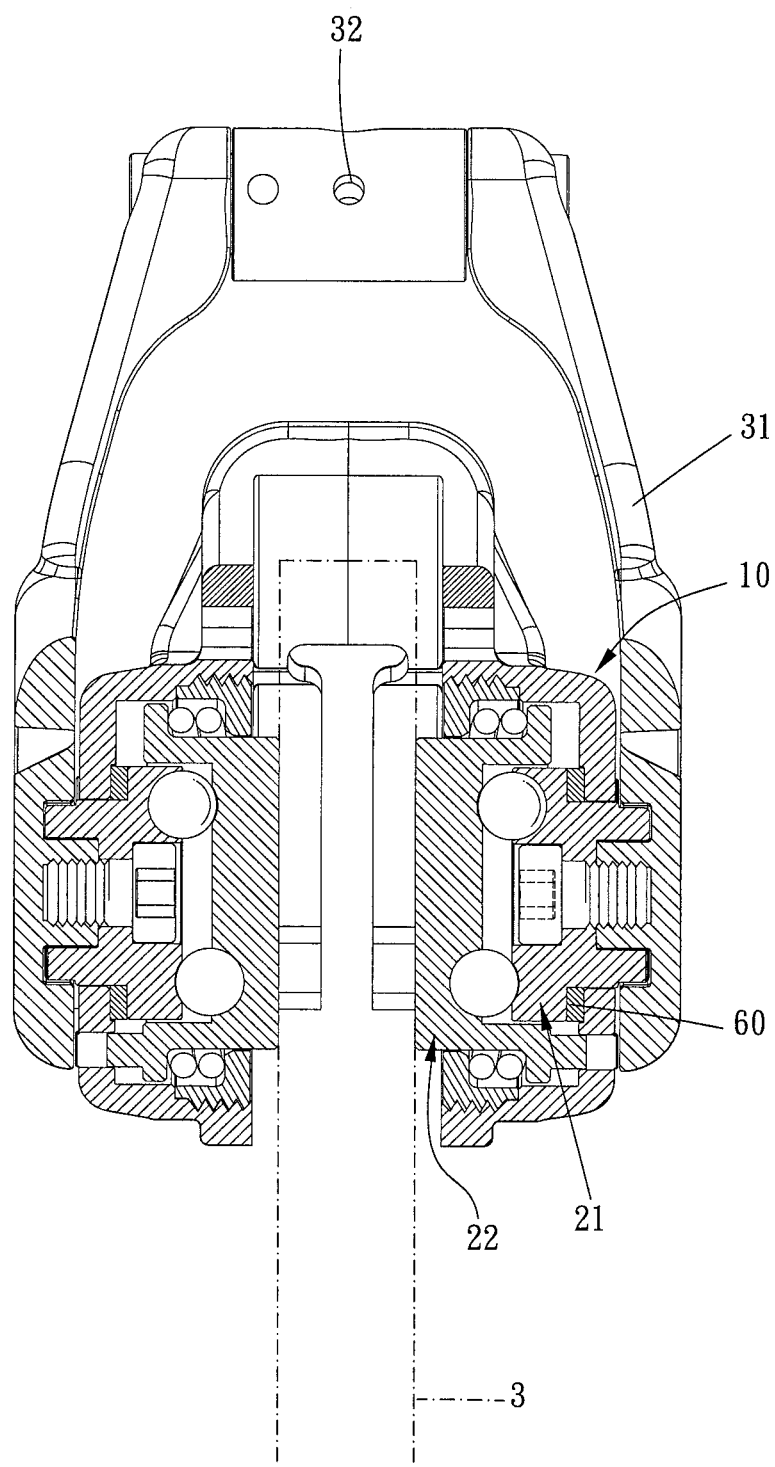
FIG. 4 is a motional view of a preferable embodiment of the present invention.

FIGS. 1 to 4 show a mechanical brake caliper for a bicycle according to a preferred embodiment of the present invention. The mechanical brake caliper 1 for a bicycle includes a caliper body 10, two axially-movable mechanisms 20 and a linkage mechanism 30.

The caliper body 10 has two mounting holes 11 which are disposed on two opposite sides of the caliper body 10, the two axially-movable mechanisms 20 are movably assembled to the two mounting holes 11 respectively, and the linkage mechanism 30 has two arm portions 31 which are connected with the two axially-movable mechanisms 20 respectively and a mounting structure 32 being for securing a brake cable 2, the linkage mechanism 30 rotates the two axially-movable mechanisms 20 to move axially to actuate two brake pads toward a disc 3 respectively, the two arm portions 31 rotate about a first rotation center portion 33 and a second rotation center portion 34 respectively, torques to the first rotation center portion 33 and the second rotation center portion 34 as a force act on the mounting structure 32 by the brake cable 2 being substantially the same. Thus, the two axially-movable mechanisms 20 can respectively steadily clip the disc 3 in substantially same forces. Besides, the caliper body 10 further includes a holding rod and a cable guiding member pivotally connected with the holding rod. The linkage mechanism 30 is movable relative to the holding rod. Thus, the brake cable 2 can be passed through the cable guiding member and secured on the mounting structure 32. Therefore, the cable guiding member can be rotated relative to the holding rod, when the brake cable is operated.

Preferably, an effective arm of the mounting structure 32 to the first rotation center portion 33 is substantially equal to an effective arm of the second rotation center portion 34, so as to actuate the two axially-movable mechanisms 20 to clip the disc 3 in substantially same forces. More specifically, the caliper body 10 is designed as a bilateral symmetrical structure, and the mounting structure 32 is arranged on the middle of the caliper body 10 which is extending from the left and right sides of the caliper body 10.

In this embodiment, the mounting structure 32 is not limited in a hole, the mounting structure can also be a groove, a pressure clamp assembly, or other restriction structure for being disposed through the brake cable 2.

In this embodiment, the first rotation center portion 33 and the second rotation center portion 34 are pivots 331, 341 each disposed in the polygonal recess 35 of one of the two arm portions 31, and each of the pivots 331, 341 protrudes toward one of the two axially-movable mechanisms 20 and protrudes out of the polygonal recess 35. Preferably, each of the first and second rotation center portions 33, 34 is arranged on an axle center. In other embodiment, the first and second rotation center portions can be arranged on an axle line, an axle hole, and so on.

The mechanical brake caliper 1 for a bicycle further includes a cable mounting member 40. The cable mounting member 40 can be regarded as a part of the linkage mechanism 30. In this embodiment, the cable mounting member 40 is pivoted to the linkage mechanism 30, and the mounting structure 32 is arranged on the cable mounting member 40 so that the cable mounting member 40 can be rotated relative to the linkage mechanism 30 to regulate a direction of the mounting structure 32.

Each of the two axially-movable mechanisms 20 includes an actuator member 21 which is movably assembled to one of the two mounting holes 11 and an axially-movable member 22 which receives at least a part of the actuator member 21, so as to thin the mechanical brake caliper 1. In this embodiment, each of the two axially-movable members 22 has a receiving recess 221 for receiving a part of the actuator member 21. The actuator member 21 is axially immovable with respect to the caliper body 10, and each of the two pivots 331, 341 is connected with the actuator member 21 and actuates the actuator member 21 to abut respectively the axially-movable member 22 of one of the two axially-movable mechanisms 20 to move axially so as to actuate the two brake pads 3 toward the disc respectively.

One of a side of each of the two axially-movable mechanisms 20 and a side of each of the two arm portions 31 of the linkage mechanism 30 has a polygonal recess 35 and the other has a polygonal rod 211 engaged with the polygonal recess 35. Thus, the linkage mechanism 30 can steadily actuate each actuator member 21 to rotate. Preferably, each of the pivot 331, 341 protrudes toward the two axially-movable mechanisms 20 and protrudes out of the polygonal recess 35, and at least part of each of the pivot 331, 341 disposed within one said actuator member 21, so as to improve the structure strength of the linkage mechanism 30. In this embodiment, each of the two axially-movable mechanisms 20 has a concave 23 corresponding to one of the pivots 331, 341, and each of the pivots 331, 341 is disposed through one said concave 23. Therefore, each of the axially-movable mechanisms 20 can be steadily connected with the linkage mechanism 30 and is not easily to be disconnected. In this embodiment, each polygonal recess 35 is a blind recess, so as to strong the structural strength of the linkage mechanism 30 to avoid damaging easily in long-term use.

The mechanical brake caliper 1 further includes two fasteners 50, the two fasteners 50 are disposed through one said actuator member 2 of one of the two axially-movable mechanisms 20 and one of the pivots 331, 341 from an inner side of the caliper body 10, so as to improve the fastening force of each fasteners 50 to connect to each actuator member 21 and the linkage mechanism 30, and to produce a span between each actuator member 21 and each axially-movable member 22, so as to reduce an abrasion between each axially-movable member 22 and the caliper body 1, to maintain the structural strength of the mechanical brake caliper 1. In other embodiment, each of the two fasteners can be respectively disposed through one of the actuator member and one of the pivots from an outer side of the caliper body.

The mechanical brake caliper 1 for a bicycle further includes two washers 60. The two opposite sides of the caliper body 10 each has a recess portion 12, each of the two washers 60 is received in one said recess portion 12, each of the two washers 60 is disposed between one said recess portion 12 and one said actuator member actuator member 21 so that each of the two washers 60 can be steadily connected with the caliper body 10 to prevent from easily sliding relative to the caliper body 10; moreover, each actuator member 21 can steadily abut against the caliper body 10 indirectly.

Each of the two opposite sides of the caliper body 10 has at least one guiding hole 13 extending axially, each guiding hole 13 can be a through hole or a blind hole. each of the two axially-movable members 22 has at least one protrusion 222 extending axially, and the at least one protrusion 222 is movably disposed through the at least one guiding hole 13. In this embodiment, a number of the at least one guiding hole 13 is plural, the plurality of the guiding holes 13 are arranged around each of the mounting holes 11. A number of the at least one protrusion 222 is plural. Thus, each axially-movable member 22 can be steadily moved axially relative to the caliper body 10 and cannot be rotated relative to the caliper body 10.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A mechanical brake caliper for a bicycle, including:
   a caliper body, having two mounting holes which are disposed on two opposite sides of the caliper body;
   two axially-movable mechanisms, movably assembled to the two mounting holes respectively; and
   a linkage mechanism, having two arm portions which are connected with the two axially-movable mechanisms respectively, and a mounting structure being for securing a brake cable, the linkage mechanism rotating the two axially-movable mechanisms to move axially to actuate two brake pads toward a disc respectively, the two arm portions rotating about a first rotation center portion and a second rotation center portion respectively, torques to the first rotation center portion and the second rotation center portion as a force acting on the mounting structure by the brake cable being substantially the same,
   wherein one of a side of each of the two axially-movable mechanisms and a side of each of the two arm portions of the linkage mechanism has a polygonal recess and the other has a polygonal rod engaged with the polygonal recess, and
   wherein each of the two arm portions has the polygonal recess, the first rotation center portion and the second rotation center portion are pivots each disposed in the polygonal recess of one of the two arm portions, and each of the pivots protrudes toward one of the two axially-movable mechanisms and protrudes out of the polygonal recess.

2. The mechanical brake caliper for a bicycle of claim 1, wherein an effective arm of the mounting structure to the first rotation center portion is substantially equal to an effective arm of the second rotation center portion.

3. The mechanical brake caliper for a bicycle of claim 1, wherein each of the two axially-movable mechanisms has a concave corresponding to one of the pivots, and each of the pivots is disposed through one said concave.

4. The mechanical brake caliper for a bicycle of claim 1, further including two fasteners, the two fasteners being respectively disposed through one of the two axially-movable mechanisms and one of the first and second rotation center portions from an inner side of the caliper body.

5. The mechanical brake caliper for a bicycle of claim 3, wherein an effective arm of the mounting structure to the first rotation center portion is substantially equal to an effective arm of the second rotation center portion; each of the two axially-movable mechanisms includes an actuator member which is movably assembled to one of the two mounting holes and an axially-movable member which receives at least a part of the actuator member, the actuator member is axially immovable with respect to the caliper body, and the first rotation center portion and the second rotation center portion are respectively connected with the actuator member of one of the two axially-movable mechanisms, the first rotation center portion and the second rotation center portion respectively rotate the actuator member of one of the two axially-movable mechanisms to abut respectively the axially-movable member of one of the two axially-movable mechanisms to move axially so as to actuate the two brake pads toward the disc respectively; the actuator member of each of the two axially-movable mechanisms has the concave, each of the pivots is disposed through one said concave; the mechanical brake caliper for a bicycle further including two fasteners, the two fasteners being respectively disposed through one of the two axially-movable mechanisms and one of the first and second rotation center portions from an inner side of the caliper body; wherein the actuator member has the multi-angular rod; each of the two opposite sides of the caliper body has at least one guiding hole extending axially, each of the two axially-movable members has at least one protrusion extending axially, and the at least one protrusion is movably disposed through the at least one guiding hole; the mechanical brake caliper for a bicycle further including two washers, the two opposite sides of the caliper body respectively having a recess portion, each of the two washers received in one said recess portion, each of the two washers disposed between one said recess portion and the actuator member of one of the two axially-movable mechanisms; the mechanical brake caliper for a bicycle further including a cable mounting member, the cable mounting member being pivoted to the linkage mechanism, the mounting structure being arranged on the cable mounting member; wherein the polygonal recess is a blind recess; each of the two fasteners is disposed through one said actuator member and one of the pivots.

6. A mechanical brake caliper for a bicycle, including:
a caliper body, having two mounting holes which are disposed on two opposite sides of the caliper body;
two axially-movable mechanisms, movably assembled to the two mounting holes respectively; and
a linkage mechanism, having two arm portions which are connected with the two axially-movable mechanisms respectively, and a mounting structure being for securing a brake cable, the linkage mechanism rotating the two axially-movable mechanisms to move axially to actuate two brake pads toward a disc respectively, the two arm portions rotating about a first rotation center portion and a second rotation center portion respectively, torques to the first rotation center portion and the second rotation center portion as a force acting on the mounting structure by the brake cable being substantially the same,
wherein each of the two axially-movable mechanisms includes an actuator member which is movably assembled to one of the two mounting holes and an axially-movable member which receives at least a part of the actuator member, the actuator member is axially immovable with respect to the caliper body, and the first rotation center portion and the second rotation center portion are respectively connected with the actuator member of one of the two axially-movable mechanisms, the first rotation center portion and the second rotation center portion respectively rotate the actuator member of one of the two axially-movable mechanisms to abut respectively the axially-movable member of one of the two axially-movable mechanisms to move axially so as to actuate the two brake pads toward the disc respectively.

7. The mechanical brake caliper for a bicycle of claim 6, wherein each of the two opposite sides of the caliper body has at least one guiding hole extending axially, each of the two axially-movable members has at least one protrusion extending axially, and the at least one protrusion is movably disposed through the at least one guiding hole.

8. The mechanical brake caliper for a bicycle of claim 6, further including two washers, the two opposite sides of the caliper body each having a recess portion, each of the two washers received in one said recess portion, each of the two washers disposed between one said recess portion and one said actuator member.

* * * * *